United States Patent [19]
Hily et al.

[11] Patent Number: 4,687,285
[45] Date of Patent: Aug. 18, 1987

[54] DEVICE FOR COUPLING A LIGHT SOURCE AND AN OPTICAL WAVEGUIDE

[75] Inventors: Claude E. Hily, Ozouer-le-Voulgis; Jacqueline-Madeleine Michel, Yerres, both of France

[73] Assignee: U.S. Philips Corporation, New York, N.Y.

[21] Appl. No.: 783,294

[22] Filed: Oct. 2, 1985

[30] Foreign Application Priority Data

Oct. 5, 1984 [FR] France ................. 84 15311

[51] Int. Cl.$^4$ ............................................. G02B 6/32
[52] U.S. Cl. ............................. 350/96.18; 350/96.15
[58] Field of Search ............ 350/96.15, 96.16, 96.18, 350/96.20, 96.21; 357/74

[56] References Cited

FOREIGN PATENT DOCUMENTS 2926925 1/1980 Fed. Rep. of Germany .

OTHER PUBLICATIONS

Cabanie, J. P., et al., "Les Methodes de Couplage d'Une Source et d'Une Fibre Optique", *Acta Electronica*, vol. 24, No. 1, pp. 105–116 (1981/1982).

*Primary Examiner*—Eugene R. LaRoche
*Assistant Examiner*—Steven J. Mottola
*Attorney, Agent, or Firm*—Marc D. Schechter

[57] ABSTRACT

A device for coupling a light source and an optical waveguide. The light source has an emissive surface whose dimensions are of the same order of magnitude as or smaller than the cross-sectional dimension of the waveguide. The coupling device comprises a ball lens, which is contact with the light source, and a convergent optical transfer system. The optical transfer system images the input face of the waveguide to the optical center of the ball lens with a magnification of approximately −1. The radiation issuing from any point of the emissive surface of the light source enters the waveguide as parallel rays.

19 Claims, 3 Drawing Figures

DEVICE FOR COUPLING A LIGHT SOURCE AND AN OPTICAL WAVEGUIDE

BACKGROUND OF THE INVENTION

The invention relates to a device for coupling a light source and an optical waveguide. The light source has an emissive surface whose dimensions are of the same order of magnitude as, or are smaller than the cross-sectional dimensions of the waveguide. The coupling device comprises a ball lens.

The invention is employed for coupling light-emitting diodes and fibers, for example graded index optical fibers. In particular it is used in cases requiring a light-emitting diode mount.

A device for coupling a light-emitting diode and a stepped index optical fiber is described in an article by J. P. Cabanié and J. J. Hunzinger entitled "Les methodes de couplage d'une source et d'une fibre optique" (*ACTA ELECTRONICA*, Vol. 24, No. 1, 1981/1982, pages 105 to 116). This article describes the use of collimating optical systems in order to optimally fill the aperture of the optical fiber.

One of these systems, given as a preferred embodiment, comprises a completely spherical lens, or ball lens, which is in contact with the emissive surface of the light-emitting diode. This ball lens is said to perform very well because it enables a gain on the order of 5.89 to be attained. On the other hand this lens has several drawbacks.

First of all, the numerical aperture of this ball lens is very large, which gives rise to geometrical aberrations. Further, the diameter of this ball lens is very small to limit insertion losses. As a result of the small diameter, the lens is difficult to handle during optical alignment of the device. Moreover, the three elements (i.e. the fiber, the ball lens and the light-emitting diode) should be in contact with each other, which gives rise to stresses in the material of the light-emitting diode which have an adverse effect on the life of this diode.

Further, it is to be noted that the device is not adapted for use with graded index fibers. The article describes how a graded index fiber is mounted directly in contact with the surface of the light-emitting diode. However, this is not possible if the light-emitting diode has a receding emission surface. Also, it gives rise to the same mechanical problems as the arrangement with a ball lens specified for fibers of the stepped index type.

Neither of these methods proposes means for an easy alignment or means for sealing the light-emitting diode.

SUMMARY OF THE INVENTION

Therefore, the present invention proposes a novel coupling device which comprises a convergent optical system, or transfer system. The optical system forms an image, with a magnification of approximately −1, of the input face of the waveguide in the optical center of the ball lens. The refractive index and the diameter of the ball lens are such that the rays issuing from any point of the emissive surface enter the waveguide as a parallel beam. The emissive surface is situated in the object focal point of the coupling device.

Thus, the device according to with the invention has the following advantages:

(a) the insertional losses are practically zero and the mounting tolerances are less strict;
(b) alignment is easy because the mounting tolerances are less stringent and because they affect the optical transfer system and not the ball lens, while the dimensions of the elements of the optical transfer system make these elements easy to handle;
(c) the distance between the input face of the optical waveguide and the first surface of the optical transfer system is sufficiently large to allow mounting a window of a sealed housing in which the light source is accommodated. As a result, the light source can be used in special environments;
(d) a light source having an emissive area which is very small relative to the effective area of the input face of the optical waveguide can be used;
(e) the emissive surface of the light source may be disposed at a small distance behind the outer walls of this light source and, in particular, the light source may be a light-emitting diode having a slightly receding emissive surface;
(f) the optical waveguide may be a graded index optical fiber;
(g) geometric aberrations due to the aperture of the ball lens are reduced substantially.

In an embodiment of the invention, the ball lens is held in contact with the light source by an adhesive whose refractive index has a value between the value of the refractive index of the ball lens and the value of the refractive index of the emissive surface of the light source, or a value as close as possible to this range of ideal values. This ensures that the light source cannot be damaged during alignment, which is very advantageous if this source is a gallium arsenide (GaAs) light-emitting diode, which is very vulnerable.

In another embodiment of the invention the optical transfer system comprises two identical planconvex lenses. The convex surfaces of the lenses face each other and are in contact with each other. The plane surface of one of the lenses, referred to as the first lens, faces the input face of the waveguide and is arranged at an optical distance D from the input face. The plane surface of the other lens, referred to as the second lens, faces the ball lens and is arranged at the same optical distance D from the optical center of the ball lens. The optical axes of the two lenses extend through the optical center of the ball lens and coincide with the normals to the centers of the input faces of the waveguide and the emissive surface of the light source.

Thus, this optical transfer system is easy to manufacture and cheap, which is very important in view of the extent of industrial developments in the field of optical waveguides.

In the device, the light source is preferably a light-emitting diode.

In an embodiment of the device, the light-emitting diode has an emissive surface whose diameter is on the order of 30 $\mu$m. The emissive surface recedes at most 5 $\mu$m relative to the outer surface of the diode.

In another embodiment of the device, the optical waveguide is of the graded index type. The fiber has a core diameter of 50 $\mu$m or 85 $\mu$m and a numerical aperture of 0.2.

The device according to the invention is suitable for coupling optical fibers in conformity with the two standards prevailing in the field of telecommunications. The light sources are generally light-emitting diodes whose emissive surfaces are substantially smaller than the input faces of the fibers.

In an embodiment of the invention, the medium separating the optical transfer system from the input face of the waveguide and from the ball lens is air.

In another embodiment of the invention a transparent plate is arranged between the input face of the optical waveguide and the optical transfer system. In this embodiment, the device further comprises a protective housing for the ball lens. The convergent optical system and the light source, the transparent plate forms the window of the housing.

Thus, the device according to the invention can meet very stringent specifications for use in special environments, for example under water or in gases of a composition which may damage the light-emitting diode.

The angles of incidence on all the optical surfaces are comparatively small and the power gain lies very close to the theoretical gain (the only losses being Fresnel losses).

DESCRIPTION OF THE PREFERRED EMBODIMENTS

Figure 1:
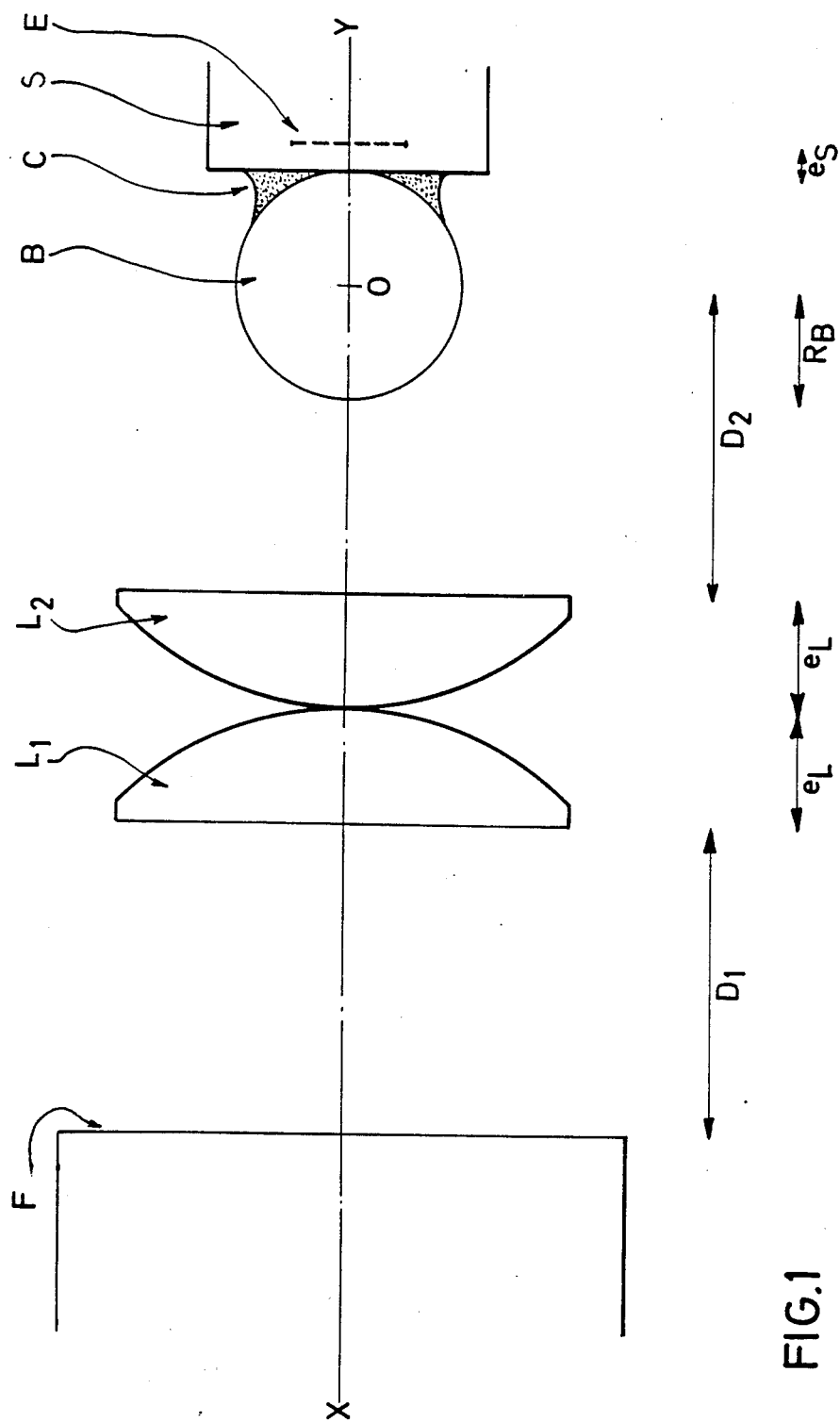
FIG. 1 is a schematic, sectional view through the optical axis of an embodiment of the coupling device.

The device according to the invention as shown in FIG. 1 serves for coupling an optical waveguide having an input face F and a core diameter $D_F$ to a light source S having an emissive surface E whose diameter $D_S$ is smaller than $D_F$.

Figure 3:
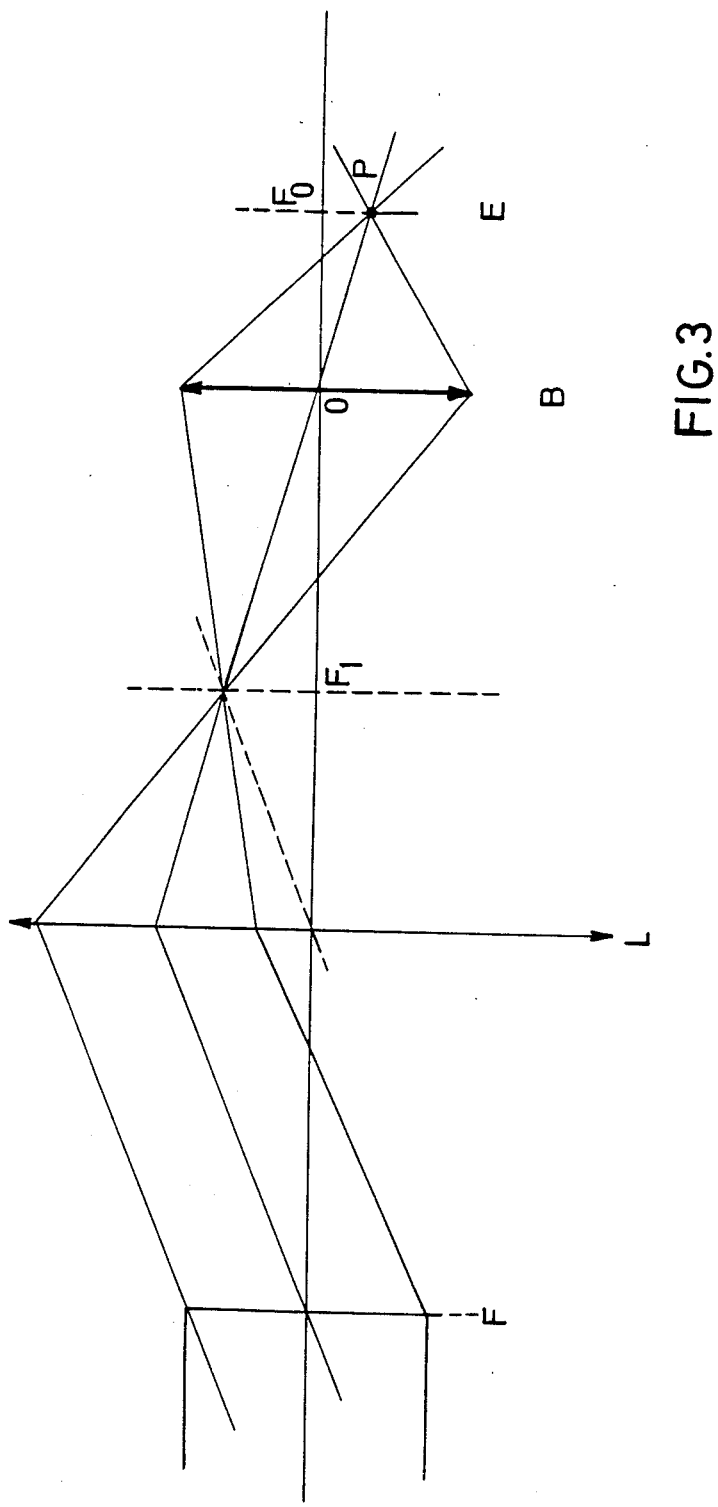
FIG. 3 schematically shows the paths followed by the light rays in the coupling device.

The coupling device comprises a completely spherical lens or ball lens B. Ball lens B images the emissive surface E, which is situated at $F_0$, in the plane $F_1$, as shown in FIG. 3.

By means of an adhesive which is transparent to the emitted radiation, the ball lens B is secured either directly to the emissive surface E or to the external surface of the light source S if the emissive surface recedes relative to this external surface. (FIG. 1.)

Allowance being made for the index $N_C$ of the adhesive and the distance from the emissive surface E, the diameter $D_B$ of the ball lens and its index $N_B$ are selected in such a way that the emissive surface E is imaged in the plane $F_1$. Plane $F_1$ is the focal plane of the optical transfer system L. (FIG. 3.)

In order to obtain this result the refractive index $N_C$ of the adhesive should as closely as possible approximate a value between the value $N_B$ of the refractive index of the ball lens and the value $N_S$ of the refractive index of the light source S.

The coupling device further comprises a second convergent optical system (optical transfer system) L which is adapted to image its focus $F_1$ at infinity in the waveguide (i.e. to image the center O of the ball lens on the input face F of the optical waveguide) with a magnification of substantially $-1$. (FIG. 3.)

Thus, this device differs from the prior art device which comprises only the ball lens which images the emissive surface E onto the input face of an optical fiber.

In one embodiment of the invention, the convergent optical system L, referred to as the optical transfer system, comprises two identical planoconvex lenses $L_1$ and $L_2$. The convex surfaces face each other and are in contact with each other. (FIG. 1.)

The optical path $D_1$ between the input face F of the optical waveguide and the plane surface of the first lens $L_1$ of the optical transfer system is substantially equal to the optical path $D_2$ between the plane surface of the second lens $L_2$ facing the ball lens and the center O of the ball lens.

Figure 2:
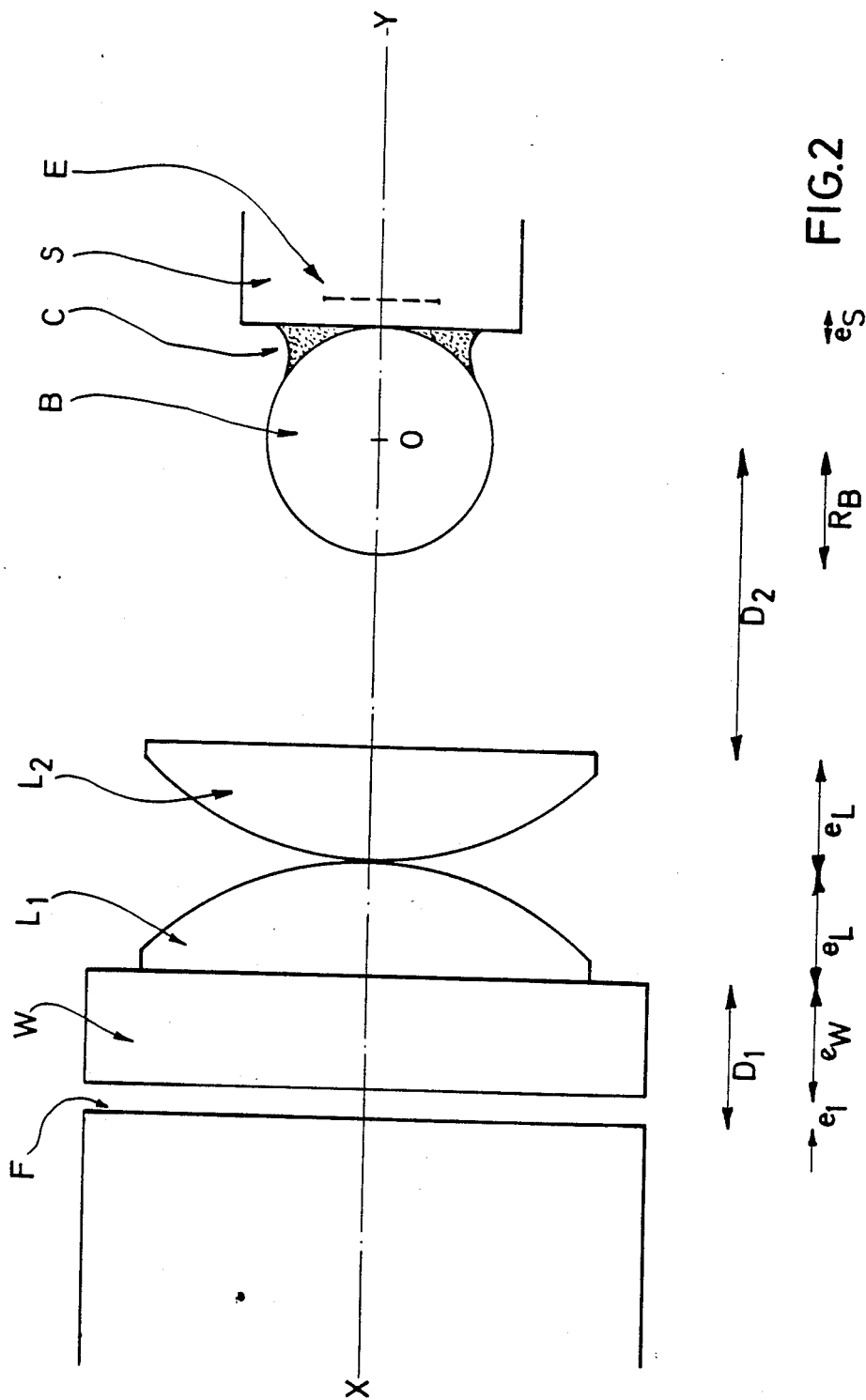
FIG. 2 schematically shows an embodiment of the device provided with a plate which serves as a window for a protective housing.

Under certain conditions, it may be desirable to protect the optical system and the light source. To this end there may be provided a protective housing having a window W through which the radiation can pass. (FIG. 2.) In this embodiment, the distance $D_1$ between the input face F of the waveguide and the plane surface of the first lens $L_1$ is sufficiently large to allow this window W to be arranged therebetween. The distance $D_1$ is then computed as a function of the thickness $e_W$ and the index $N_W$ of the window W in such a way that the optical path $D_1$ remains equal to the optical path $D_2$ between the plane surface of the second lens $L_2$ and the center O of the ball lens.

If the core diameter of the waveguide F is $D_F$ and the diameter of the emissive surface of the source $D_S$, the magnification $\mu$ is given by the equation $$\mu = \frac{D_S}{D_F}$$

The theoretical gain G of the system is then given by the relationship:

$$G = \frac{1}{\mu^2(1 + \mu^2/4)}.$$

This relationship also applies to the prior art device as described on page 108 of the article by Cabanie et al.

Example No. 1

The light source S is a gallium arsenide (GaAs) light-emitting diode whose emissive surface has a diameter of:

$D_S \approx 30$ microns

The optical waveguide is a graded index optical fiber which may either have a core diameter $D_{F1} \approx 50$ microns in accordance with the old telecommunication standards, or a core diameter $D_{F2} \approx 85$ microns in accordance with the new standard, and a numerical aperture Sin $u_F \approx 0.2$ The diameter of the ball lens is $D_B \approx 216$ microns, i.e. approximately 7 times the diameter of the emissive surface of the diode, and its index of refraction is $N_B \approx 1.94$. This makes it possible for the ball lens not to be in direct contact with the emissive surface, but to be in contact with the external surface of the diode if the diode is of the buried type. As a result of the present construction the emissive surface may be situated at a distance $e_S \approx 5$ μm from the external surface of the diode. The ball lens may be made of a dense glass, for example lead glass or lanthanum glass.

The adhesive used for securing the ball lens to the diode is an epoxy resin having an index $N_C = 1.56$.

The index N of an ideal adhesive for this purpose should lie between the index $N_B$ of the ball lens and the index $N_S$ of the emissive surface, i.e.

$N_B \leq N \leq N_S$.

However, since such an adhesive is not available with the present state of the art, the present type of adhesive is employed because it provides optimum results.

The optical transfer system L comprises two planoconvex lenses $L_1$ and $L_2$ whose convex surfaces face one another. Their diameters are $D_L = 3$ mm, and their indices of refraction are $N_L = 1.75$.

The lenses may be made of ruby glass or a dense flint glass. These lenses have thicknesses $e_L = 0.9$ mm along the optical axis, and their convex surfaces have a radii of curvature $R_L = 2.2$ mm.

The distance between the input face of the optical fiber and the plane surface of the first lens $L_1$ is $D_1 \approx 3.13$ mm.

This distance measured in air is substantially equal to the distance $D_2$ between the plane surface of the second lens $L_2$ and the center O of the ball lens, i.e. ;p $D_2 \approx D_1 \approx 3.13$ mm.

Once the ball lens has been secured to the diode the system is optically aligned by moving the optical transfer system along the optical axis. The optical axis is the axis which is normal both to the input face of the optical fiber and to the emissive surface of the light-emitting diode and which passes through the centers of these surfaces and the center O of the ball lens.

An optical transfer system of these dimensions according to the invention renders these alignments very easy, because this optical system is easy to handle.

Via the coupling device comprising the ball lens and the optical transfer system, the light-emitting diode illuminates a uniform area of 100 micron diameter. The input face of the optical fiber can be arranged in this area easily regardless of its diameter (50 or 85 microns).

The indices of the lenses of the optical transfer system are sufficiently high to minimize geometrical aberrations produced by these lenses. The angles of incidence on the optical surfaces along the arrangement remain always smaller than 60°, which enables an actual gain close to the theoretical value to be obtained. These gains are, for example, $G_{theoretical} = 2.55$ $G_{actual} = 2.1$.

Finally, the coupling device may be protected by a sealed housing. The mechanical part of this housing will not be described here because it is irrelevant to the present invention.

Such a housing should be provided with a window W as shown in FIG. 2. This window comprises a plate having parallel surfaces and is made of a material which is transparent to the radiation emitted by the light-emitting diode. It is interposed between the plane surface of the lens $L_1$, with which it is in contact, and the input face of the optical fiber. It may be made of, for example, silica glass. In the present case it has a thickness $e_W = 2.5$ mm and an index $N_W = 1.46$.

Thus, the optical fiber should be arranged at a distance $e_1$ of approximately 190 microns from the outer surface of this window.

The optical path between the input face of the optical fiber and the plane surface of the first lens $L_1$ is always identical to the optical path between the plane surface of the second lens $L_2$ and the center O of the ball lens. However, the actual path $D'_1$ is shorter than the actual path $D_2$ because allowance must to be made for the optical path through the window being greater than the thickness of the window. Therefore, $D'_1 \approx 2.69$ mm.

Example No. 2

This example differs from the preceding example only in that the planoconvex lenses have greater thicknesses measured along the optical axis. This renders them less vulnerable and easier to handle. The light source is again a buried-type gallium arsenide (GaAs) light-emitting diode and the waveguide is a graded index optical fiber.

For a better understanding, the characteristics of the various elements of the coupling device according to the invention are listed in Table I, which makes it easier to compare the two examples.

The values of $D'_1$ and $D_2$ in this table apply to the case when a window having the specified thickness $E_W$ is interposed in the manner described above.

TABLE 1

| Example No. 1 | Example No. 2 |
| --- | --- |
| S = GaAs LED | S = GaAs LED |
| $D_S = 30$ μm | $D_S = 30$ μm |
| $e_S \leq 5$ μm | $e_S \leq 5$ μm |
| $D_{F1} = 50$ μm | $D_{F1} = 50$ μm |
| $D_{F2} = 85$ μm | $D_{F2} = 85$ μm |
| Sin $u_F = 0.2$ | Sin $u_F = 0.2$ |
| F = graded index fiber | F = graded index fiber |
| $D_B = 210$ μm | $D_B = 216$ μm |
| $N_B = 1.94$ | $N_B = 1.94$ |
| $N_C = 1.56$ | $N_C = 1.56$ |
| $D_L = 3$ mm | $D_L = 3$ mm |
| $N_L = 1.75$ | $N_L = 1.75$ |
| $e_L = 0.9$ mm | $e_L = 2.18$ mm |
| $e_W = 2.5$ mm | $e_W = 1.5$ mm |
| $N_W = 1.46$ | $N_W = 1.46$ |
| $D_1 = 2.69$ mm | $D_1 = 1.51$ mm |
| $e_1 = 190$ μm | $e_1 = 100$ μm |
| $D_2 \approx 3.13$ mm | $D_2 = 2.43$ mm |
| $G_{theoretical} = 2.55$ | $G_{theoretical} = 2.55$ |
| $G_{actual} = 2.1$ | $G_{actual} = 2.1$ |

It will be evident that other variants of this coupling device are conceivable without departing from the scope of the present invention as defined in the appended claims.

What is claimed is:

1. A device for coupling a light source and an optical waveguide, said waveguide having an input face, said device comprising:

a light source having an emissive surface with a size less than or equal to that of the input face of the optical waveguide;

a ball lens arranged in contact with the light source, said ball lens having a center; and a convergent optical system arranged between the ball lens and the input face of the waveguide, said optical system forming an image of the input face with a magnification of approximately −1 in the center of the ball lens;

characterized in that:

the ball lens and the optical system has a focal point; and the emissive surface of the light source is arranged at the focal point of the ball lens and the optical system so that rays emitted from any point on the emissive surface enter the waveguide as a parallel beam.

2. A device for coupling a light source and an optical waveguide, said waveguide having an input face, said device comprising:
a light source having an emissive surface with a size less than or equal to that of the input face of the optical waveguide;
a ball lens arranged in contact with the light source, said ball lens having a center; and
a convergent optical system arranged between the ball lens and the input face of the waveguide, said optical system forming an image of the input face with a magnification of approximately −1 in the center of the ball lens;
characterized in that:
the ball lens and the optical system has a focal point;
the emissive surface of the light source is arranged at the focal point of the ball lens and the optical system so that rays emitted from any point on the emissive surface enter the waveguide as a parallel beam;
the ball lens is held in contact with the light source by an adhesive; and
the adhesive, the ball lens, and the emissive surface have indices of refraction, said adhesive having an index of refraction between the index of refraction of the ball lens and the index of refraction of the emissive surface.

3. A device as claimed in claim 1, characterized in that the light source is a light-emitting diode.

4. A device as claimed in claim 3, characterized in that:
the light-emitting diode has an outer surface; and
the emissive surface has a diameter on the order of 30 microns and is located at most 5 microns from the outer surface inside the light-emitting diode.

5. A device as claimed in claim 4, characterized in that the optical waveguide is a graded index waveguide having a core diameter of 50 microns and a numerical aperture of approximately 0.2.

6. A device as claimed in claim 4, characterized in that the optical waveguide is a graded index waveguide having a core diameter of 85 microns and a numerical aperture of approximately 0.2.

7. A device as claimed in claim 4, characterized in that the optical system and the input face of the waveguide are separated by air.

8. A device as claimed in claim 4, characterized in that the optical system and the input face of the waveguide are separated by a transparent plate.

9. A device as claimed in claim 8, characterized in that the device further comprises a protective housing in which the light source is arranged, the transparent plate forming a window in the housing.

10. A device for coupling a light source and an optical waveguide, said waveguide having an input face, said device comprising:
a light source having an emissive surface with a size less than or equal to that of the input face of the optical waveguide;
a ball lens arranged in contact with the light source, said ball lens having a center; and
a convergent optical system arranged between the ball lens and the input face of the waveguide, said optical system forming an image of the input face with a magnification of approximately −1 in the center of the ball lens;
characterized in that:
the ball lens and the optical system has a focal point;
the emissive surface of the light source is arranged at the focal point of the ball lens and the optical system so that rays emitted from any point on the emissive surface enter the waveguide as a parallel beam;
the optical system comprises first and second identical planoconvex lenses, each lens having a plane surface and a convex surface, said lenses being arranged with their convex surfaces facing each other;
the plane surface of the first lens faces the input face of the waveguide, the optical distance between the plane surface of the first lens and the input face of the waveguide being $D_1$;
the plane surface of the second lens faces the ball lens, the optical distance between the plane surface of the second lens and the center of the ball lens being $D_2$;
$D_1$ is substantially equal to $D_2$; and
the lenses have optical axes which pass through the center of the ball lens and which are normal to the input face of the waveguide and to the emissive surface of the light source.

11. A device as claimed in claim 10, characterized in that:
the ball lens is held in contact with the light source by an adhesive; and
the adhesive, the ball lens and the emissive surface have indicies of refraction, said adhesive having an index of refraction between the index of refraction of the ball lens and the index of refraction of the emissive surface.

12. A device as claimed in claim 11, characterized in that the light source is a light-emitting diode.

13. A device as claimed in claim 12, characterized in that:
the light-emitting diode has an outer surface; and
the emissive surface has a diameter on the order of 30 microns and is located at most 5 microns from the outer surface inside the light-emitting diode.

14. A device as claimed in claim 13, characterized in that the optical waveguide is a graded index waveguide having a core diameter of 50 microns and a numerical aperture of approximately 0.2.

15. A device as claimed in claim 13, characterized in that the optical waveguide is a graded index waveguide having a core diameter of 85 microns and a numerical aperture of approximately 0.2.

16. A device as claimed in claim 13, characterized in that the optical system and the input face of the waveguide are separated by air.

17. A device as claimed in claim 13, characterized in that the optical system and the input face of the waveguide are separated by a transparent plate.

18. A device as claimed in claim 17, characterized in that the device further comprises a protective housing in which the light source is arranged, the transparent plate forming a window in the housing.

19. A device for coupling a light source and an optical waveguide, said waveguide having an input face, said device comprising:
a light source having an emissive surface with a size less than or equal to that of the input face of the optical waveguide;

a ball lens arranged in front of the light source, said ball lens having a center; and a convergent optical system arranged between the ball lens and the input face of the waveguide, said optical system forming an image of the input face with a magnification of approximately −1 in the center of the ball lens;

characterized in that:

the ball lens and the optical system has a focal point; and the emissive surface of the light source is arranged at the focal point of the ball lens and the optical system so that rays emitted from any point on the emissive surface enter the waveguide as a parallel beam.

* * * * *